Figure 1:
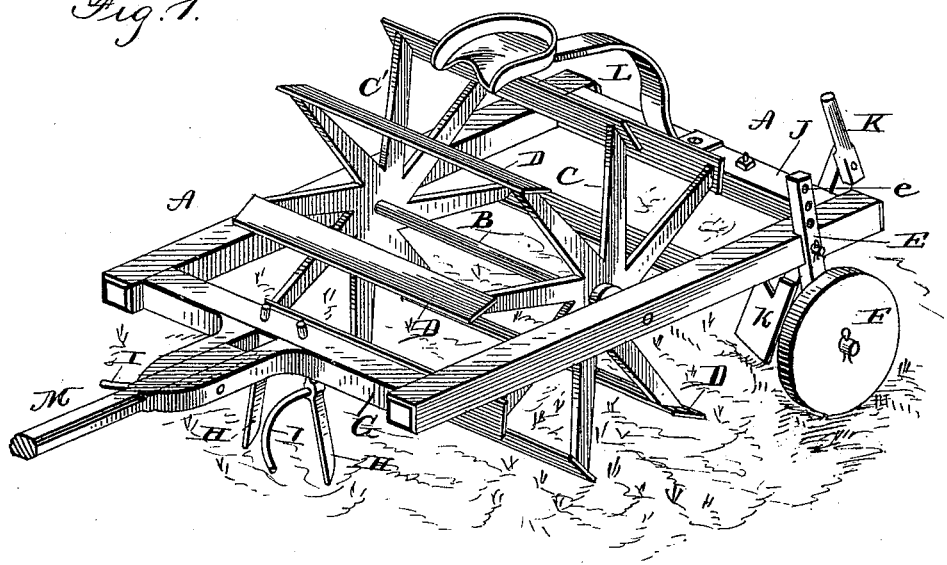

(No Model.)

W. M. BREEDEN.
STALK CUTTER.

No. 404,256. Patented May 28, 1889.

WITNESSES.
F. L. Ourand
R. W. Elliott

INVENTOR.
William M. Breeden,
by J. Louis Daggett & Co.
Attorneys.

UNITED STATES PATENT OFFICE.

WILLIAM MANSHIP BREEDEN, OF BENNETTSVILLE, SOUTH CAROLINA.

STALK-CUTTER.

SPECIFICATION forming part of Letters Patent No. 404,256, dated May 28, 1889.

Application filed September 28, 1888. Serial No. 286,678. (No model.)

*To all whom it may concern:*

Be it known that I, WILLIAM MANSHIP BREEDEN, a citizen of the United States, and a resident of Bennettsville, in the county of Marlborough and State of South Carolina, have invented certain new and useful Improvements in Stalk-Cutters; and I do hereby declare that the following is a full, clear, and exact description of the invention, which will enable others skilled in the art to which it appertains to make and use the same.

This invention relates to stalk-cutters.

The object is to produce a stalk-cutter which shall be simple of construction, efficient and durable in use, and comparatively inexpensive of production.

With these objects in view the invention consists in the novel construction and combination of parts of a stalk-cutter, as will be hereinafter fully described in the specification, illustrated in the drawings, and more particularly pointed out in the claim.

Figure 2:
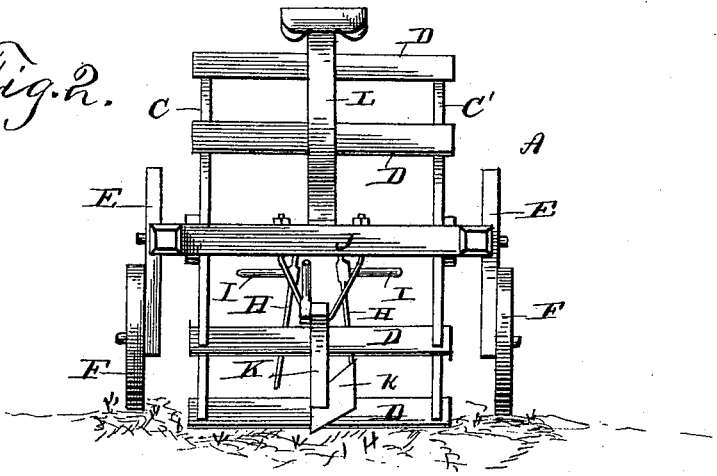

In the accompanying drawings, forming part of this specification, and in which like letters of reference indicate corresponding parts, Figure 1 is a perspective view of the device, and Fig. 2 is an end view of the same.

Referring to the drawings, A designates the frame of the device, which may be made of any suitable material, but preferably of wood. At a point near the center of this frame is mounted a shaft, B, on which revolves armed wheels C and C', the two being connected by means of metallic blades D, which are set at a slant on the said arms. At a point near the rear portion of this frame are secured two arms, E, to the lower end of which are secured wheels F, designed to support the device when going through a field by running in the furrows on each side of a hill. The upper portions of the arms E are provided with a number of openings, e, by means of which the frame may be raised or lowered, so as to allow the blades to sink any desired depth into the furrow.

To the front beam, G, of the frame are secured two diverging and downwardly-extending arms, H, to which are secured two outwardly-extending arms, I, the purpose of these arms being to force the stalks or stubble in between the arms H and under the blades of the wheels C.

To the rear beam, J, of the device is attached a root-cutter, K, the blade of which is made square, as shown at $k$, so as to insure its cutting the roots and not passing any of them. To the said rear beam is also secured a spring, L, which is bent to curve over the wheels, the outer end of the spring being provided with a seat for the driver.

When this device is to be used, horses are hitched to a tongue, M, secured to the front beam, G, and as the device is moved the stubble or stalks are forced in between the arms I and through the downwardly-extending arms H and under the blades of the wheels C. The weight of the machine cuts the stalks off under the ground close enough to allow the ground to be easily plowed over. The root-cutter K, which is operated in the manner of an ordinary plow, then cuts any of the roots which may have been left uncut by the blades on the wheels.

It will thus be seen that although this device is exceedingly simple in construction it will be found highly efficient and durable in use, and may be constructed at a comparatively slight expense.

Having thus fully described my invention, what I claim as new, and desire to secure by Letters Patent, is—

In a stalk-chopper, the combination, with the rectangular frame provided with the transverse shaft journaled therein and having the armed wheels C C' on its ends, of the inclined blades connecting corresponding arms of said wheels, the conveyer-wheels journaled on adjustable arms F, and the diverging arms secured to the front of the rectangular frame and provided with outwardly and downwardly curved arms I, and the cutter provided with the rectangular blade K, substantially as specified.

In testimony that I claim the foregoing as my own I have hereunto affixed my signature in presence of two witnesses.

WILLIAM MANSHIP BREEDEN.

Witnesses:
G. W. ERVIN,
W. H. STUBBS.